(12) United States Patent
Andersson

(10) Patent No.: US 6,658,033 B1
(45) Date of Patent: Dec. 2, 2003

(54) METHOD OF EVALUATING TUNEABLE LASERS

(75) Inventor: Lars Andersson, Belle Mead, NJ (US)

(73) Assignee: Altitun AB, Jarfalla (SE)

( * ) Notice: Subject to any disclaimer, the term of this patent is extended or adjusted under 35 U.S.C. 154(b) by 0 days.

(21) Appl. No.: 09/913,668

(22) PCT Filed: Feb. 15, 2000

(86) PCT No.: PCT/SE00/00291
§ 371 (c)(1), (2), (4) Date: Jan. 2, 2002

(87) PCT Pub. No.: WO00/49692
PCT Pub. Date: Aug. 24, 2000

(30) Foreign Application Priority Data

Feb. 17, 1999 (SE) ............................................... 9900535

(51) Int. Cl.$^7$ ................................................ H01S 3/00
(52) U.S. Cl. ...................................... 372/38.02; 372/33
(58) Field of Search ............................. 372/20, 32, 50, 372/96, 38.02, 33, 38.07

(56) References Cited

U.S. PATENT DOCUMENTS 5,359,613 A  * 10/1994  Mols et al. .................... 372/20
6,298,075 B1 * 10/2001  Kitaoka et al. ............... 372/33

FOREIGN PATENT DOCUMENTS

EP  0 529 732   3/1993
EP  0 774 684   5/1997

OTHER PUBLICATIONS

Optical Fiber Communication Conference, 1999, OFC/IOOC '99, Technical Digest, 1999 (21–26/2) San Diego, vol. 2, pp. 137–139. (Feb. 1999).

* cited by examiner

Primary Examiner—Quyen Leung
(74) Attorney, Agent, or Firm—Altera Law Group, LLC

(57) ABSTRACT

A method of evaluating a tuneable laser and determining suitable hysteresis-free laser operation points. The laser includes two or more tuneable sections in which injected current can be varied, the tuneable sections including at least one reflector section and one phase section. The current injected through the reflector section is varied at different constant currents injected through respective remaining tuneable sections. The laser power output is measured at the front or the rear mirror of the laser while sweeping the reflector current in one direction and then in the opposite direction back to its starting value. The power difference with one and the same reflector current is calculated in the different sweep directions, and those combinations that give rise to a power difference that falls below a predetermined level are detected and stored as hysteresis-free current combinations.

7 Claims, 3 Drawing Sheets

METHOD OF EVALUATING TUNEABLE LASERS

BACKGROUND OF THE INVENTION

1. Field of the Invention

The present invention relates to a method of evaluating tuneable lasers and therewith discover systematically good operation points.

The method can be used to evaluate and select lasers with respect to wavelength coverage already at an early stage, and systematically discover good operation points.

2. Description of the Related Art

Tuneable semiconductor lasers have a number of different sections through which current is injected, typically three or four such sections. The wavelength, power and mode purity of the lasers can be controlled by adjusting the current injected into the various sections. Mode purity implies that the laser is tuned to an operation point, i.e. tuned to a combination of the three or four injected drive currents, which is characterized in that the laser is distanced from a combination of the drive currents where so-called mode jumps take place and where lasering is stable and side mode suppression is high.

Special wavelength controls are required with different applications. For instance, in the case of sensor applications it must be possible to tune the laser continuously, so as to avoid mode jumps as far as possible. In the case of telecommunications applications, it is necessary that the laser is able to retain its wavelength to a very high degree of accuracy and over very long periods of time, after having set the drive currents and the temperature. A typical accuracy in this respect is 0.1 nanometer and a typical time period is 20 years.

In order to be able to control the laser, it is necessary to map the behavior of the laser as a function of the various drive currents. This is necessary prior to using the laser after its manufacture.

Mapping of the behavior of a laser is normally effected by connecting the laser to different measuring instruments and then varying the drive currents systematically. Such instruments are normally power meters, optical spectrum analyzers for measuring wavelength and sidemode suppression, and line width measuring devices. This laser measuring process enables all of these parameters to be fully mapped as a function of all different drive currents.

One problem is that lasers exhibit hysteresis. As a result of the hysteresis, the laser will deliver different output signals in the form of power and wavelength in respect of a given drive current set-up, i.e., with respect to a given operation point, depending on the path through which the laser has passed with respect to the change in said drive currents, in order to arrive at the working point in question. Thus, this means that a given drive current set-up will not unequivocally give the expected wavelength or power.

SUMMARY OF THE INVENTION

The present invention relates to a method which results in ensuring that unequivocal operation points are obtained.

Accordingly, the present invention relates to a method of evaluating a tuneable laser and determining suitable laser operation points. The laser includes two or more tuneable sections in which injected current can be varied, said sections including at least one reflector section and one phase section. The method includes varying the current injected through the reflector section, i.e., the reflector current, at different constant currents injected through respective remaining tuneable sections. The laser power output at the front or the rear mirror of the laser is measured, and the reflector current is swept in one direction and then in the opposite direction back to its starting value while measuring and storing the power. The power difference with one and the same reflector current is calculated, but in the different sweep directions. Those combinations which give rise to a power difference that falls below a predetermined level are detected and stored as hysteresis-free current combinations.

BRIEF DESCRIPTION OF THE DRAWINGS

The invention will now be described in more detail partly with reference to exemplifying embodiments thereof and partly with reference to the accompanying drawings, in which.

DESCRIPTION OF THE PREFERRED EMBODIMENTS

Figure 1:
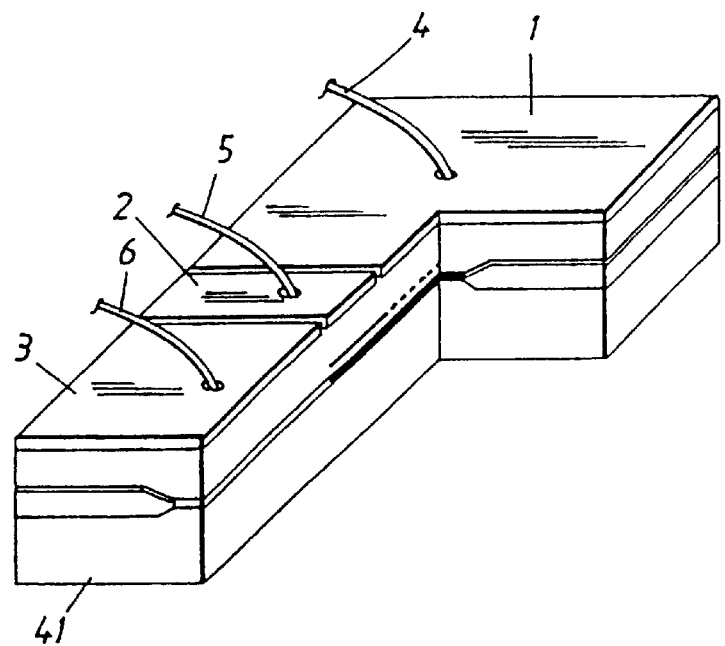
FIG. 1 is a perspective, partially cut-away view of a DBR laser.

Shown in FIG. 1 is a DBR laser which includes three sections, namely a Bragg reflector 1, a phase section 2 and a gain section 3. Each section is controlled by injecting current into respective sections through respective electric conductors 4, 5, 6.

Figure 2:
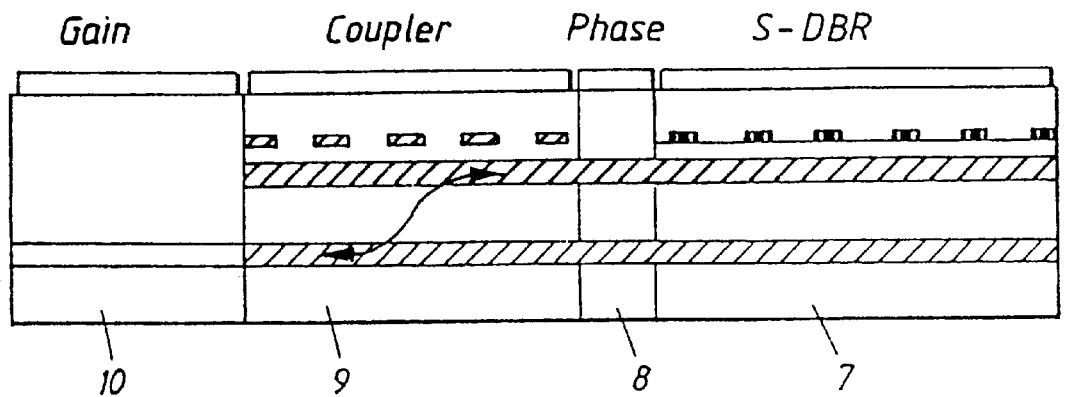
FIG. 2 is a sectioned view of a tuneable Grating Coupled Sampled Reflector (GCSR) laser.

FIG. 2 is a sectional view of a tuneable Grating Coupled Sampled Reflector (GCSR) laser. Such a laser includes four sections, i.e., a Bragg reflector 7, a phase section 8, a coupler 9 and a gain section 10. Each of the sections is controlled by injecting current into the respective sections.

Figure 3:
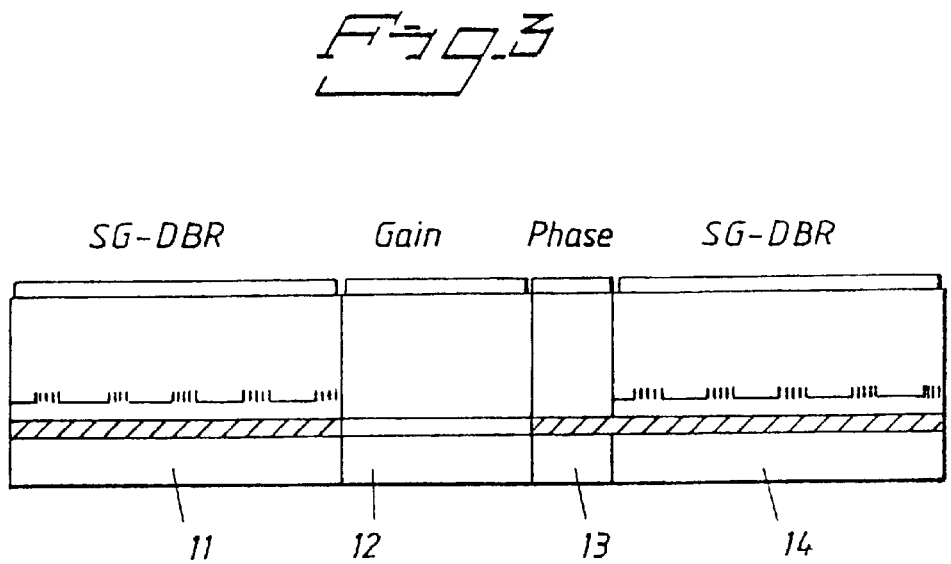
FIG. 3 is a sectioned view of a Sampled Grating DBR laser.

FIG. 3 is a sectional view of a Sampled Grating DBR laser that also includes four sections 11, 12, 13, 14, of which sections 11 and 14 are Bragg, reflectors, section 13 is the phase section, and section 12 is the gain section.

These three laser types are common, although other types of lasers exist.

Although the invention is described below essentially with reference to a GCSR laser according to FIG. 2, it will be understood that the invention is not restricted to any particular type of tuneable semiconductor laser, but can be applied correspondingly with tuneable lasers other than those illustrated by way of example in the drawings.

The present invention relates to a method of evaluating tuneable lasers and determining suitable laser operation points. The laser may thus contain two or more tuneable sections in which injected current can be varied in a known manner. The laser is of the kind which includes at least one reflector section and one phase section.

According to the invention, the current injected through the reflector section, i.e., the reflector current, is varied with different constant injected currents in the respective remaining tuneable sections while measuring the laser power output at the front or rear mirror of the laser. The reflector current is first swept in one direction and then in the opposite direction back to the start value of the reflector current, while measuring and storing the power output.

Figure 4:
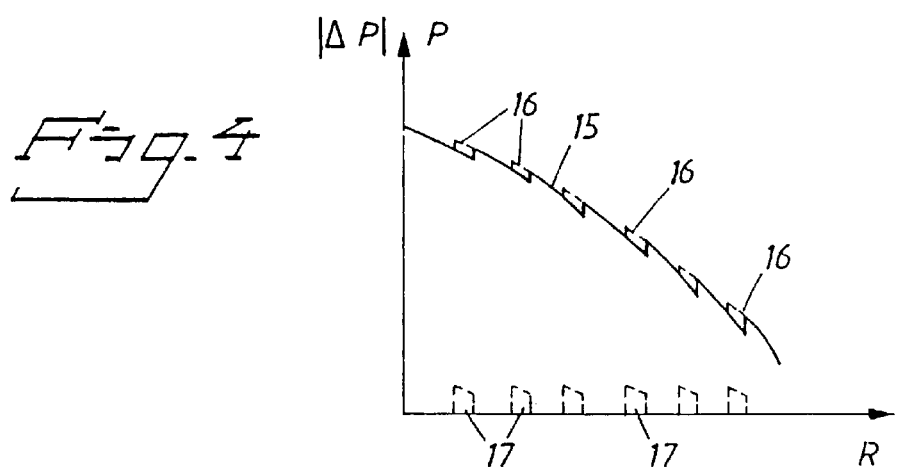
FIG. 4 is a schematic diagram illustrating power output as a function of reflector current.

The hysteresis effect is illustrated in FIG. 4. When the reflector current R is increased from a start value to a predetermined maximum value, the laser power P passes through the full line curve 15. When the reflector current then falls back to said start value, the power P passes through the full line curve with the exception of certain parts thereof at which said current passes in accordance with the broken line curve section 16. The discrepancy at those parts is due to the hysteresis of the laser, where the laser passes through a mode jump at different control levels, depending on sweep direction. These parts of the curve are thus the hysteresis regions.

The laser transmits different wavelengths and, of course, different power outputs, depending on whether the laser operates along the lower portion 16 or the upper portion 15 of said curve part for one and the same reflector current. This means that a certain current combination will not cause the laser to transmit unequivocally a certain wavelength nor yet a certain unequivocal power.

According to the invention, the difference in power is calculated with one and the same reflector current R, but in said different sweep directions. FIG. 4 shows these differences along the R-axis as the absolute value of differences in power P in the hysteresis regions. The hysteresis power is thus described by the regions 17.

According to the invention, those current combinations that give rise to a power difference, i.e., said absolute values, beneath a predetermined level are also detected. In FIG. 4, those values of the reflector current R that lie between the regions 17 lie beneath said predetermined level. These values are stored as mutually hysteresis-free current combinations between the reflector current and remaining injected currents.

When the laser includes a phase section, a coupler section and a reflector section, the power output of the laser in different planes is measured each with a constant phase current PH but with varying coupler current C and reflector current R, where the reflector current R is the inner variable. This is illustrated partially in FIG. 5.

Figure 5:
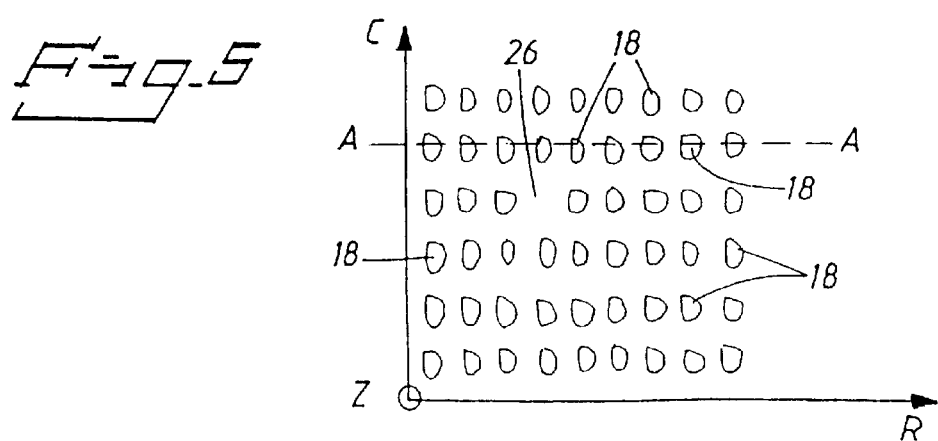
FIG. 5 is a diagrammatic illustration of a hysteresis pattern over coupler current as a function of reflector current.

FIG. 5 shows the coupler current as a function of the reflector current for a given phase current. The Z-axis shows the hysteresis value, i.e. the absolute value of the power difference within each hysteresis region 18. These regions correspond to the hysteresis region 17 in FIG. 4. Thus, a section along the line A—A in FIG. 5 corresponds to a curve according to FIG. 4.

Figure 6:
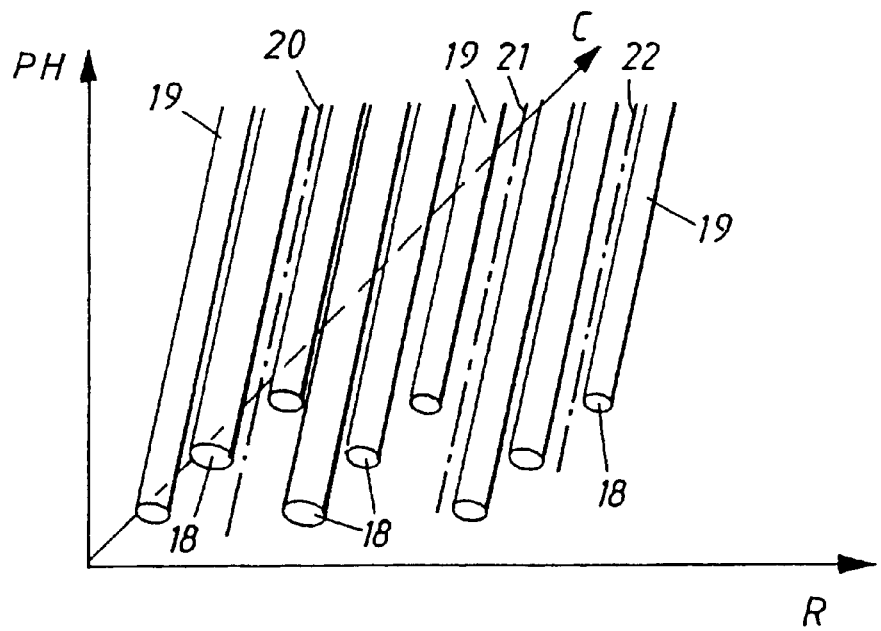
FIG. 6 is a three-dimensional diagram showing phase current, coupler current and reflector current.

When such C-R planes according to FIG. 5 are measured for different values of the phase current PH, there is obtained a three-dimensional diagram of the kind shown schematically in FIG. 6. In principle, the hysteresis regions 18 in the C-R plane extend as cylinder-like volumes 19 in the three-dimensional space C, R, PH. These volumes thus constitute the hysteresis regions for combinations of C, R and PH. The hysteresis-free regions are those volumes that are located between the cylinder-like volumes 19. FIG. 6 merely illustrates this principle, and does not claim to be drawn to scale, for instance.

In this embodiment of the method, such hysteresis-free current combinations in the three-dimensional space between phase current, coupler current and reflector current are determined and stored. For instance, there can be stored lines 20–22 along which the laser moves while hysteresis-free, while changing the wavelength along respective lines 20–22.

According to one preferred embodiment, the current injected in the gain section is constant while remaining currents are varied, because the gain current does not give rise to any appreciable hysteresis.

Although measurement of a GCSR laser has been taken as an example in the foregoing, it will be understood that the invention can be applied to any other type of laser, as before mentioned.

A Sampled Grating DBR laser according to FIG. 3 can be measured in a manner corresponding to that described above, by allowing the current in respective reflector sections 11, 14 to sweep while supplying one of said reflector sections with a constant current in order to map the hysteresis regions for different phase currents.

Figure 7:
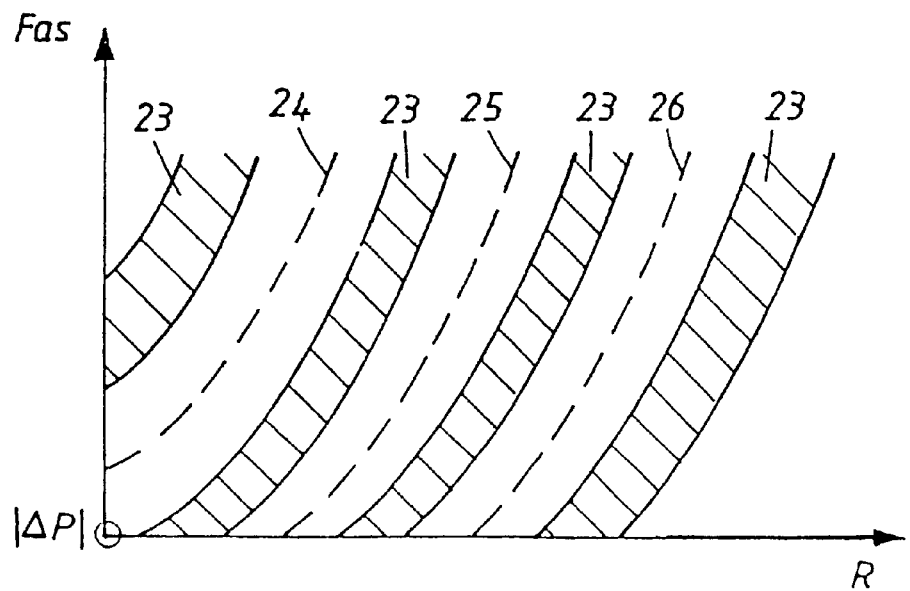
FIG. 7 is a diagrammatic illustration of the hysteresis regions for a DBR laser.

A DBR laser has only a phase section and a reflector section. A diagram corresponding to that of FIG. 6 will therefore be two-dimensional in the case of a DBR laser. One such diagram is exemplified in FIG. 7. The Z-axis shows the absolute value of the hysteresis effect. The regions 23 signify the hysteresis regions and the lines 24–26 signify lines along which the laser can operate free from hysteresis. The wavelength transmitted by the laser varies along the lines 24–26.

According to one highly preferred embodiment, the wavelength transmitted by the laser is determined for current combinations that give hysteresis-free regions. This can take place, for instance, along the lines 20–22 in FIG. 6. Thus, after having been taken into use, the laser can be controlled to transmit a certain wavelength and therewith with a current combination that will not cause the laser to operate in a hysteresis region.

It may be beneficial in some cases to control a laser so that its operation point will lie within a hysteresis region instead of between the hysteresis regions. In such cases, it is essential that the laser is controlled so that it will approach the operation point from the correct direction, i.e., with a rising or falling current through the laser sections that are being controlled.

According to one preferred embodiment of the invention, there is determined the regularity of occurring hysteresis regions in different current planes, such as in the coupler-current reflector-current plane. This is illustrated in FIG. 5.

FIG. 5 shows a plurality of hysteresis regions 18 which are relatively regular with respect to size and placement. Provided that the hysteresis regions are regular, the laser can be considered to be one that can be controlled to transmit different wavelengths by changing the current combinations, without unforeseen discontinuous jumps being expected with certain current combinations.

However, FIG. 5 lacks a hysteresis region at reference numeral 26. This signifies that the laser includes irregularities of a kind that means that the laser can be expected to make an unforeseen jump, such as a mode jump, or discontinuously change its properties in response to a certain continuous change of a current combination.

According to one preferred embodiment, the regularity in said C-R plane is determined for different phase currents.

The discovery that the hysteresis pattern is not regular may be a criterion on which the laser is scrapped.

Although the invention has been described above with reference to two types of lasers, it will be understood that the present invention can be applied with any type of laser that includes sections in which current is injected and which give rise to hysteresis.

It will also be understood that the order in which the sections through which current is injected are evaluated with respect to hysteresis regarding the reflector current has no importance.

The present invention is therefore not restricted to the aforedescribed and illustrated exemplifying embodiments, since variations can be made within the scope of the following claims.

What is claimed is:

1. A method of evaluating a tuneable laser and determining suitable laser operation points, wherein the laser includes two or more tuneable sections in which injected current can be varied, said sections including at least one reflector section and one phase section, said method comprising the steps of: varying the current injected through the reflector section at different constant currents injected through respective remaining tuneable sections; measuring the laser power output at one of the front and the rear mirror of the laser; sweeping the reflector current in one direction and then in the opposite direction back to its starting value while measuring and storing the power; calculating the power difference with one and the same reflector current, but in said different sweep directions; and detecting and storing as hysteresis-free current combinations those combinations which give rise to a power difference that falls below a predetermined level.

2. A method according to claim 1, in which the laser includes a phase section, a coupler section, and a reflector section, including the step of: measuring the laser power output in different planes each having constant phase current and varying coupler current C and reflector current R, where the reflector current R is an inner variable; and storing hysteresis-free current combinations in a three-dimensional space defined by phase current PH, coupler current C and reflector current R.

3. A method according to claim 1, wherein the current injected in the phase section is constant.

4. A method according to claim 1, including the step of: determining the regularity of occurring hysteresis regions in different current planes.

5. A method according to claim 4, including the step of: determining said regularity in said planes for different phase currents PH.

6. A method according to claim 1, including the step of: determining the wavelength transmitted by the laser for current combinations that give hysteresis-free regions.

7. A method according to claim 1, including the step of: determining the regularity of occurring hysteresis regions in a current plane defined by values of coupler current and reflector current.

* * * * *